United States Patent

[11] 3,585,297

[72] Inventors Thomas J. Scuitto
Malibu;
Boris Stefanov, Los Angeles, both of, Calif.
[21] Appl. No. 734,276
[22] Filed June 4, 1968
[45] Patented June 15, 1971
[73] Assignee Wyle Laboratories
El Segundo, Calif.

[54] KEYBOARD FOR GENERATING CODED SIGNALS
4 Claims, 5 Drawing Figs.

[52] U.S. Cl. ........ 178/17,
340/365, 197/98, 235/145
[51] Int. Cl. ........ H04l 15/06
[50] Field of Search ........ 179/90 K;
178/17 A, 17 C; 235/145, 146; 197/98; 340/365

[56] References Cited
UNITED STATES PATENTS
3,495,236 2/1970 Mathamel ........ 340/347
3,129,418 4/1964 DeLaTour ........ 340/345
2,997,703 8/1961 Powell ........ 340/347
2,814,031 11/1957 Davis ........ 340/174

*Primary Examiner*—Kathleen H. Claffy
*Assistant Examiner*—Tom D'Amico
*Attorneys*—Samuel Lindenberg and Arthur Freilich

ABSTRACT: A keyboard including a plurality of manually actuatable keys each having means associated therewith for producing a set of uniquely coded signals. More particularly, a plurality of ferrite cores are provided each associated with a different one of the keys. Each key carries a permanent magnet which saturates the associated core for so long as the key remains unactuated. When a key is actuated, its magnet is moved so as to unsaturate the core associated therewith. A set of sense lines is uniquely threaded through each core and a drive line is coupled to all of the cores. An excitation current continually applied to the drive line is coupled to the sense lines only by an unsaturated core.

INVENTORS
THOMAS J. SCUITTO
BORIS STEFANOV
BY Lindenberg + Freilich
ATTORNEYS

KEYBOARD FOR GENERATING CODED SIGNALS

BACKGROUND OF THE INVENTION

1. Field of the Invention

This invention relates to a keyboard whose keys can be manually actuated to produce coded signals uniquely identifying the actuated key.

2. Description of the Prior Art

Keyboards are commonly utilized in electronic equipment as manual input devices. In such applications, it is normally necessary to provide some means responsive to the actuation of a key for generating a unique set of identifying signals. For example, assume that the keyboard is comprised of 64 keys to thus enable a user to selectively identify one of 64 different alpha numeric characters. It will be readily recognized that a six digit binary code is sufficient to uniquely identify each of 64 different characters. Accordingly, a typical prior art keyboard will be comprised of a diode matrix which uniquely couples each of 64 different input lines to six output lines. In such a prior art keyboard, actuation of a key will, for example, apply a potential through prewired diodes to the output lines so as to produce a set of pulses on the output lines unique to the actuated key. Although such prior art keyboard configurations have operated very satisfactorily, they have proved to be rather expensive due primarily to the extensive diode matrix required.

SUMMARY OF THE INVENTION

It is accordingly an object of the present invention to provide an improved keyboard in which each of a plurality of manually actuable keys can produce a set of uniquely coded signals.

Briefly, in accordance with the present invention, a common drive line is selectively coupled, by key action, to a subset of a set of sense lines, which subset is unique to the actuated key, to thus produce coded signals on the sense lines indicative of which key was actuated.

In accordance with a preferred embodiment of the present invention, a keyboard is provided including a plurality of saturable ferrite cores with each core being supported proximate to a different one of a plurality of manually actuatable keys. Each key carries a permanent magnet which is disposed so as to normally saturate the associated core. However, when the key is actuated, the magnet moves away from and desaturates the core. A common drive line is coupled to all of the cores. Each core is coupled to a unique subset of a set of sense lines. An alternating excitation signal is continually applied to the drive line. When a core is saturated, it cannot couple the drive line signal to the sense lines. However, when a core is desaturated, it does couple the drive line signal to the unique subset of sense lines coupled thereto.

The novel features of the invention are set forth with particularity in the appended claims. The invention will best be understood from the following description when read in conjunction with the accompanying drawings. BRIEF DESCRIPTION OF THE DRAWINGS FIG. 1 is a block diagram of a keyboard in accordance with the invention;

Figures 1, 2, 4:
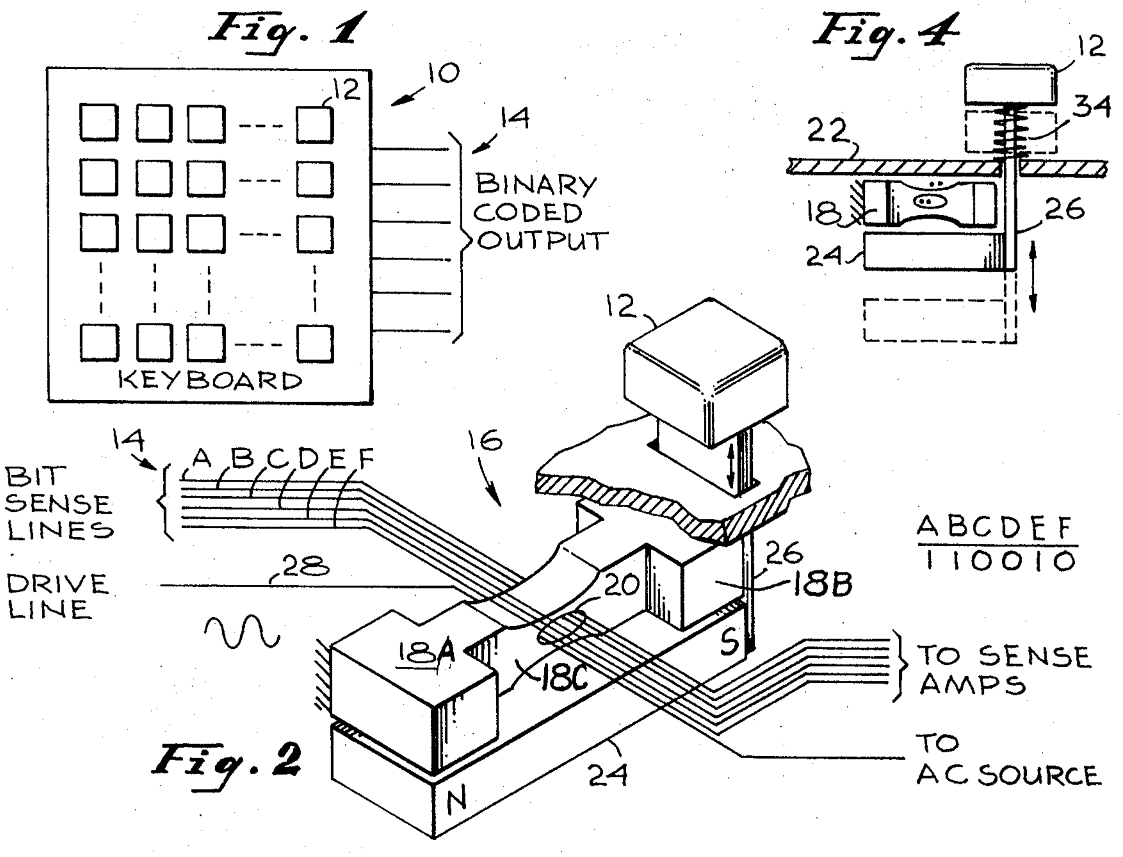
FIG. 2 is a perspective illustration of a switch assembly in accordance with the present invention.
Figure 3:
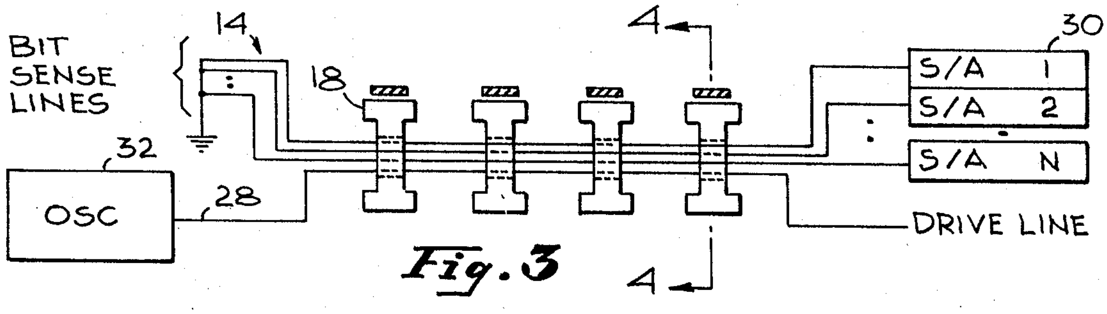
FIG. 3 is a schematic plan view of a portion of a keyboard constructed in accordance with the present invention.
Figure 5:
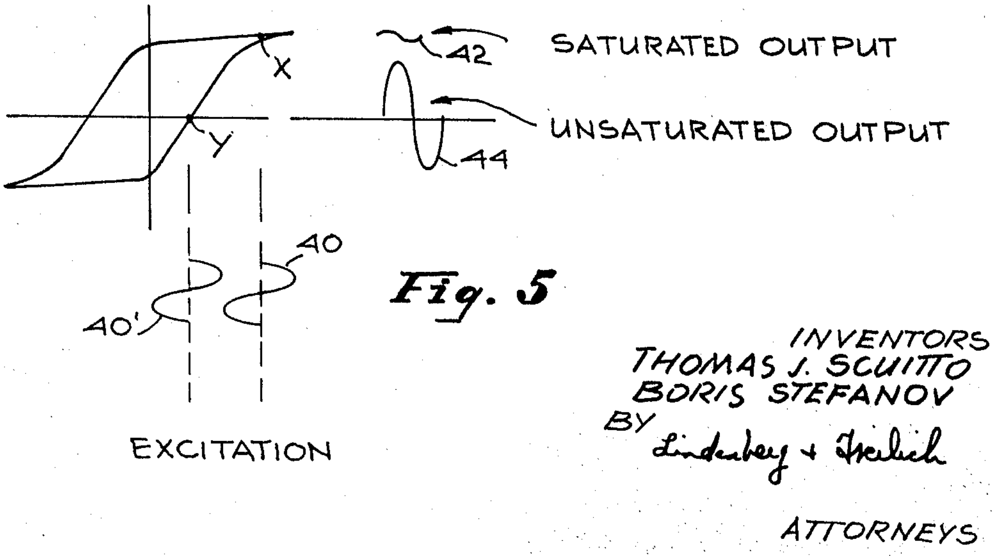

FIG. 4 is a sectional view taken substantially along the plane 4—4 of FIG. 3; and FIG. 5 illustrates a typical ferrite core hysteresis curve which is shown to explain the operation of an embodiment of the invention. DESCRIPTION OF THE PREFERRED EMBODIMENTS Attention is now called to FIG. 1 which illustrates a keyboard 10 constructed in accordance with the teachings of the present invention. Although the keyboard can of course include any number of keys, it will be assumed herein that it is comprises of 64 different manually actuatable keys 12. Means are provided in accordance with the invention for generating binary coded signals on the sense or output lines 14 identifying an actuated key. Since 64 different keys are assumed, six sense lines 14 are illustrated, it being recognized that a six digit binary code will yield 64 unique combinations, each of which can identify a different one of the keys.

Attention is now called to FIG. 2 which illustrates a switch assembly 16 which is associated with each key 12. The switch assembly includes a saturable ferrite core 18 having first and second enlarged end portions 18A and 18B and a reduced cross section intermediate portion 18C extending therebetween. An aperture 20 extends through the intermediate portion 18C. The ferrite core 18 is preferably fixedly suspended from a plate 22. The switch assembly 16 further includes a permanent magnet 24 which is mounted for movement toward and away from the ferrite core 18. More particularly, the magnet 24 is secured to an actuator bar 26 which in turn is secured to the key 12.

In accordance with the present invention, a drive line 28 is threaded through the aperture 20. Additionally, selected ones of the six sense lines 14 are also threaded through the aperture 20. In the typical switch assembly shown in FIG. 2, the six sense lines are respectively labeled A, B, C, D, E, and F. It will be noted that sense lines A, B and E are threaded through the aperture 20 while lines C, D and F pass over the core 18. As will be seen hereinafter, actuation of the key 12 of FIG. 2 will couple a pulse only to lines A, B, and E to thereby generate the code 110010 on the sense lines 14.

Attention is now called to FIG. 3 which illustrates a schematic plan view of a plurality of switch assemblies 16. It will be noted that different selected ones of, i.e. a unique subset, of the set of six sense lines 14, are threaded through each of the cores 18. One end of each of the sense lines is connected to a common source of reference potential, as ground, and the other end of each of the sense lines is connected to a unique sense amplifier means 30. The common drive line 28 threading all of the cores 18 is connected to an oscillator 32 continually providing alternating energization current to the drive line.

Attention is now called to FIG. 4 which illustrates a key and switch assembly in cross section and shows a bias means, such as spring 34, biasing the actuator 26 into a first position in which the permanent magnet 24 engages the saturable core 18. For simplicity, a coil spring 34 can be disposed around the actuator 26 between the key 12 and the plate 22. In the normal position shown in full line in FIG. 4, the magnet 24 will engage and saturate the core 18. As will be discussed in connection with FIG. 5, as long as the core 18 is saturated, it will not couple the excitation signal on drive line 28 to any of the sense lines 14. However, when the key 12 is depressed to the dotted line position shown in FIG. 4, the magnet 24 will move away from and desaturate the core 18. As a consequence, the core will then couple the drive line excitation current to the subset of sense lines actually threaded through the core.

Attention is now called to FIG. 5 which illustrates a typical hysteresis curve for the saturable ferrite core 18. It will be noted that if the core is saturated, for example, to the operating point X, then the applied drive line excitation signal 40 will produce a negligible output signal 42 on each of the sense lines threaded through the core. On the other hand, if the core is not saturated and defines an operating point Y, for example, then the same drive line excitation signal 40′ will provide a substantial output signal 44 on those sense lines threaded through the core.

From the foregoing, it will be recognized that the six sense lines can be uniquely threaded with respect to each of 64 different ferrite cores 18 so as to produce a unique binary identifying code on the sense lines in response to the actuation of any of the keys. It will also be recognized that the coded identifying signals are generated directly in response to the key actuation and without the need of any encoding diode matrix.

In addition to the functional electrical advantages already discussed, it is pointed out that the structural configuration of the invention affords attractive mechanical characteristics. More particularly, by biasing the permanent magnet into contract with the core 18, a magnetic force is of course created therebetween which tends to resist manual depression of the key. This initial resisting force prevents inadvertent actuation of the key. The force however, decreases significantly once it is manually overcome and the magnet is moved out of engagement with the core 18.

Although particular embodiments of the invention have been described and illustrated herein, it is recognized that modifications and variations may readily occur to those skilled in the art and consequently it is intended that the claims be interpreted to cover such modifications and equivalents.

What we claim is:

1. A switch assembly for selectively coupling a drive line to preselected ones of a set of sense lines, said switch assembly comprising:

a magnetic core comprised of a slab of ferrite material having first and second enlarged end portions and a reduced cross section intermediate portion connecting said end portions, said intermediate portion having an aperture extending therethrough;

means threading said drive line and said preselected sense lines through said magnetic core aperture;

a switch actuator;

a permanent magnet mounted on said actuator having pole ends spaced by substantially the same distance as said core end portions;

means mounting said actuator for movement between a first position, at which said magnet pole ends engage said core end portions to saturate said core, and a second position at which said magnet is displaced from said core; and means for resiliently urging said actuator into said first position for engaging said magnet and said core to produce a magnetic holding force therebetween tending to oppose movement of said actuator to said second position.

2. A keyboard including a plurality of manually actuatable keys for producing a set of coded signals in response to the actuation of each of said keys which signals uniquely identify the actuated key, said keyboard including:

a plurality of switch assemblies each including a magnetic core comprised of a slab of ferrite material having first and second enlarged end portions and a reduced cross section intermediate portion connecting said end portions, said intermediate portion having an aperture extending therethrough, and a permanent magnet having pole ends spaced by substantially the same distance as said core end portions and movable between a first position, at which said magnetic pole ends engage said core end portions to saturate said core, and a second position at which said magnet is displaced from said core;

means for resiliently urging all of said permanent magnets to said first position for engaging said magnets and said cores to produce a magnetic holding force therebetween tending to oppose movement of said magnets to said second position;

means coupling each of said keys to a different one of said permanent magnets for moving the magnet to said second position in response to the key being actuated;

a common drive line coupled to each of said magnetic cores;

a plurality of sense lines coupled in unique combinations to each of said magnetic cores; and means applying an exciting signal to said common drive line whereby said signal will be coupled to said sense lines by a core defining an unsaturated state.

3. The switch assembly of claim 1 including means for continually applying an alternating signal to said drive line.

4. The switch assembly of claim 1 including sense means coupled to each of said sense lines.